United States Patent [19]

Stluka et al.

[11] Patent Number: 4,767,152
[45] Date of Patent: Aug. 30, 1988

[54] TRAILER DOOR ACTUATING MECHANISM

[75] Inventors: Eugene F. Stluka, Haverford; William J. Huber, Audubon, both of Pa.

[73] Assignee: Florig Equipment Company, Inc., Conshohocken, Pa.

[21] Appl. No.: 35,971

[22] Filed: Apr. 8, 1987

[51] Int. Cl.[4] .............................................. B60P 7/02
[52] U.S. Cl. .................................... 296/100; 296/101; 49/110
[58] Field of Search ................... 296/100, 101; 49/110, 49/118, 368; 298/23 C

[56] References Cited

U.S. PATENT DOCUMENTS

| | | | |
|---|---|---|---|
| 1,170,193 | 2/1916 | Rutan | 49/110 |
| 1,573,372 | 5/1925 | Burton | 298/17.18 |
| 2,069,414 | 2/1937 | Lentz et al. | 105/377 X |
| 3,628,828 | 12/1971 | Page | 105/377 X |
| 3,833,255 | 9/1974 | Logue | 296/101 |
| 3,861,737 | 1/1975 | Kirkbride | 296/100 |
| 3,913,969 | 10/1975 | Hoch | 296/100 |
| 3,995,890 | 12/1976 | Fletcher | 296/10 |
| 4,029,356 | 6/1977 | Hoch | 49/340 |
| 4,210,358 | 7/1980 | Sweet et al. | 296/100 |
| 4,223,941 | 9/1980 | Janzen et al. | 296/100 |
| 4,474,344 | 10/1984 | Bennett | 49/368 X |
| 4,542,931 | 9/1985 | Walker, Jr. | 296/100 |
| 4,627,658 | 12/1986 | Vold et al. | 296/100 |

FOREIGN PATENT DOCUMENTS

| | | |
|---|---|---|
| 1135784 | 8/1962 | Fed. Rep. of Germany . |
| 2351558 | 4/1975 | Fed. Rep. of Germany . |
| 3300387 | 7/1984 | Fed. Rep. of Germany . |
| 3529524 | 2/1987 | Fed. Rep. of Germany . |
| 729208 | 7/1932 | France . |
| 71019 | 6/1977 | Japan . |
| 836429 | 6/1960 | United Kingdom . |

Primary Examiner—Dennis H. Pedder
Attorney, Agent, or Firm—Volpe and Koenig

[57] ABSTRACT

A mechanism to control opening/closing of a container door[s] is disclosed. The mechanism is generally located at one end of the container and utilizes a geometric arrangement of opposing fluid actuated cylinders, control members and pivot members to control movement of the doors. A control mechanism allows an operator to selectively open the doors simultaneously or independently. In the preferred embodiment, the control members are rigid members each attached at its top end to a respective door and at its bottom end to a respective pivot member rotatably mounted to the container. Distances between each of the control member bottom ends and a respective one of the rotatable mounts of the respective pivot member to the container for both control members are substantially equal.

19 Claims, 5 Drawing Sheets

TRAILER DOOR ACTUATING MECHANISM

BACKGROUND OF THE INVENTION

This invention relates to trailer covers, and more particularly to a mechanism to control the opening/closing of doors for covering a refuse trailer.

Refuse trailers are used in an environment that requires a highly reliable mechanism that will operate under rugged conditions. The use of chain drives or gear driven mechanisms are susceptible to failure since debris can be caught in chain links and gear teeth. Additionally, premature wear of chains and gear teeth may occur due to the environment encountered and provision of an adjustment means is generally required in such mechanism.

The use of dual mechanisms located at both ends of a trailer increases the potential for mechanism failure since such a design is inherently more complex. Trailer covers in most existing systems also have a limited range of motion that they can be moved through. Additionally, failure to fully control trailer covers throughout their entire range of motion allows covers to bang against the trailer resulting in damage to the trailer and the door opening/closing mechanism.

SUMMARY OF THE INVENTION

It is accordingly an object of the present invention to provide a novel mechanism to open/close a trailer cover that is located at one end of the trailer.

It is another object of the present invention to provide a novel mechanism for controllably opening/closing a trailer cover through an arc of rotation of about 270° and preferably 274°.

It is still another object of the present invention to provide a novel mechanism that can substantially continuously control the opening/closing of a pair of trailer door covers.

It is yet a further object of the present invention to provide a novel mechanism that can selectively open either one of a pair of doors for covering a trailer.

It is a still further object of the present invention to provide a novel mechanism that can selectively open both doors of a pair of trailer door covers either substantially simultaneously or independently.

It is yet another object of the present invention to provide a novel mechanism to open/close a trailer cover that is operated hydraulically.

It is a still further object of the present invention to provide a novel mechanism for opening/closing a trailer cover that is powered by an existing hydraulic system utilized by a truck trailer.

The present invention utilizes a novel geometric arrangement of opposing fluid actuated cylinders and pivot members to provide a mechanism for opening/closing a pair of doors for covering a trailer. The opening/closing mechanism is controlled by an electric control system operable from a panel on the trailer or from the truck cab. This system enables the operator to selectively operate both doors substantially simultaneously or independently. Furthermore, the operation of both doors is fully controlled through their arc of rotation. Additionally, the opening/closing mechanism can be powered by either hydraulic or pneumatic pressure supplied by a dedicated source or from an existing source in use on the truck for other purposes.

The invention avoids the use of chain drives or complex gearing which significantly decreases its susceptibility to failure resulting from the environment the apparatus operates in. The apparatus is located at only one end of the trailer so mechanical linkages requiring coordination between typical opening/closing equipment located at both ends of the trailer are eliminated. Additionally, the movement of the doors is fully controlled to avoid damage to the trailer or the doors which could result from the doors being allowed to bang against the trailer.

The invention features, in one aspect, apparatus for actuating a trailer cover through an arc of approximately 270° and preferably 274°. The apparatus includes a pair of doors rotatably connected to the a trailer top along a longitudinal edge of the trailer, means for opening/closing the doors by controllably rotating the doors through their arc, and a control mechanism for selectively opening/closing the doors substantially simultaneously or independently.

The means for opening/closing the doors includes a pair of opposed fluid actuated cylinders located at one end of the trailer. Each cylinder has a free end and a fixed end. The fixed ends are rotatably connected to the trailer. It also includes a first pivot member and a second pivot member rotatably attached to the cylinder free ends on a common horizontal center line. The means for opening/closing the doors further includes a pair of substantially identical door control members. Each control member is attached to one of the doors at the top end of the respective door control member. The bottom end of each control member is attached to one of the pivot members so that the distance between the bottom ends of the control members and the point of rotatable connection of each of the pivot members is substantially equal.

In preferred embodiments of the invention each of the doors further includes a rubber or flexible sealing lip, located along the distal edge of the door and extending the length of the door. Each of the doors further includes a torque tube affixed to the door that extends the length of the door. The torque tube is located adjacent the longitudinal edge of the door that is affixed to the trailer. The torque tube is rotatably connected to one of the door control members. Each of the doors further includes a plurality of support ribs affixed to the door and to the torque tube for resisting torsional distortion of the door. Each of the doors is rotatably connected to the trailer top along a longitudinal edge of the trailer by a plurality of hinges. Each hinge is offset from the point where the door edge and longitudinal edge of the trailer coincide. Each of the pair of opposed fluid actuated cylinders is an hydraulic cylinder or alternatively a pneumatic cylinder. Each of the door control members further includes a slot at its bottom end, and a pivot pin, capable of translational motion in the slot, for connecting the door control member with the respective first or second pivot member.

The invention further includes a pair of bumpers. Each of the bumpers are attached to the trailer edge adjacent the top corner of the trailer end. The bumpers are capable of partially resisting motion of the door control members when the doors are moved from an opened to a closed position. The means for opening/closing the doors further includes a plurality of flow valves for regulating the fluid provided to each of the fluid actuated cylinders. A plurality of grease fittings are located at points of rotational attachment of the door control members, the torque tubes, the first and second pivot members, and the fixed ends of the fluid actuated cylinders.

The invention features, in another aspect, apparatus for actuating a trailer cover through an arc of approximately 270° and preferably 274°. The apparatus includes a trailer, a pair of doors, a mechanism for opening/closing the doors, a pair of stops and a control mechanism for selectively opening/closing the doors substantially simultaneously or independently.

The mechanism for opening/closing the doors is capable of controllably rotating the doors through an arc of approximately 270° and preferably 274°. The mechanism includes a pair of opposed hydraulic actuated cylinders located at one end of the trailer. Each cylinder has a free end and a fixed end. The fixed ends are rotatably connected to the trailer. It also includes a first pivot member and a second pivot member rotatably attached to the cylinder free ends on a horizontal center line of the trailer. The mechanism further includes a pair of substantially identical door control members. Each control member is attached to one of the doors at the top end of the respective door control members. Each control member has a slot at its bottom end that allows translational motion of a pivot pin connecting the bottom end of the control member to one of the pivot members. The distance between the bottom end of each control member and the points of rotatable connection of each of the pivot members to the trailer is substantially equal.

All features and advantages of the invention will be apparent from the following detailed description of the preferred embodiments and from the claims.

For a full understanding of the present invention, reference should now be made to the following description and to the accompanying drawings.

DETAILED DESCRIPTION OF THE PREFERRED EMBODIMENTS

Figure 1:
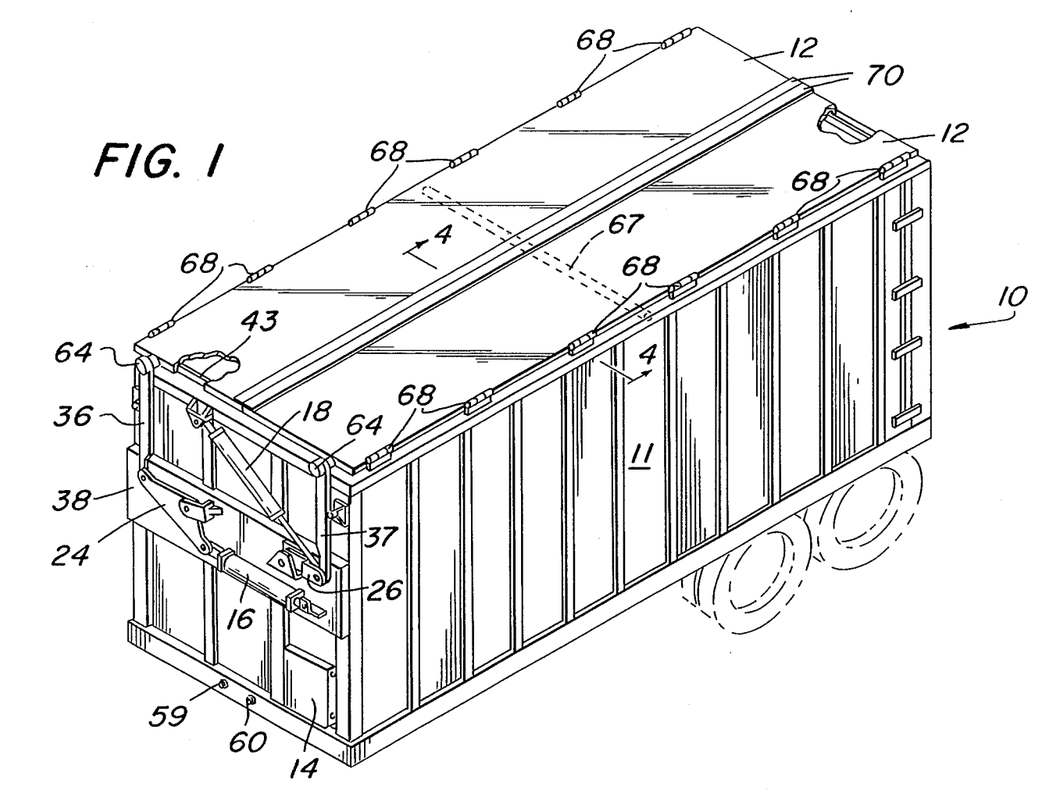
FIG. 1 is a simplified perspective view of the invention showing the door opening mechanism and the truck doors in a closed position.

Referring to FIG. 1, there is shown an illustrative view of the invention mounted on a refuse trailer 10. The invention comprises a pair of doors 12 which close the top of the refuse trailer 10, and a novel mechanism for controlling opening/closing of the doors.

Figure 2:
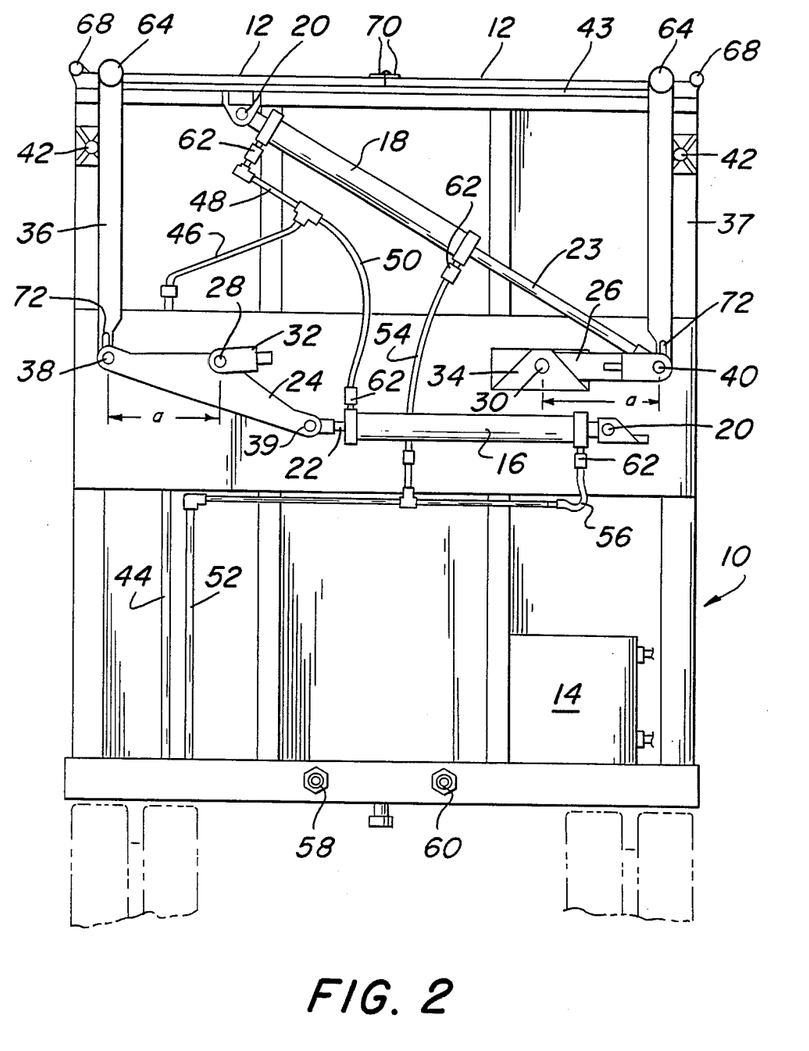
FIG. 2 is a front view of the invention shown in FIG. 1, with the truck doors in a closed position and the fluid lines connected to the acuation cylinders.
Figure 3:
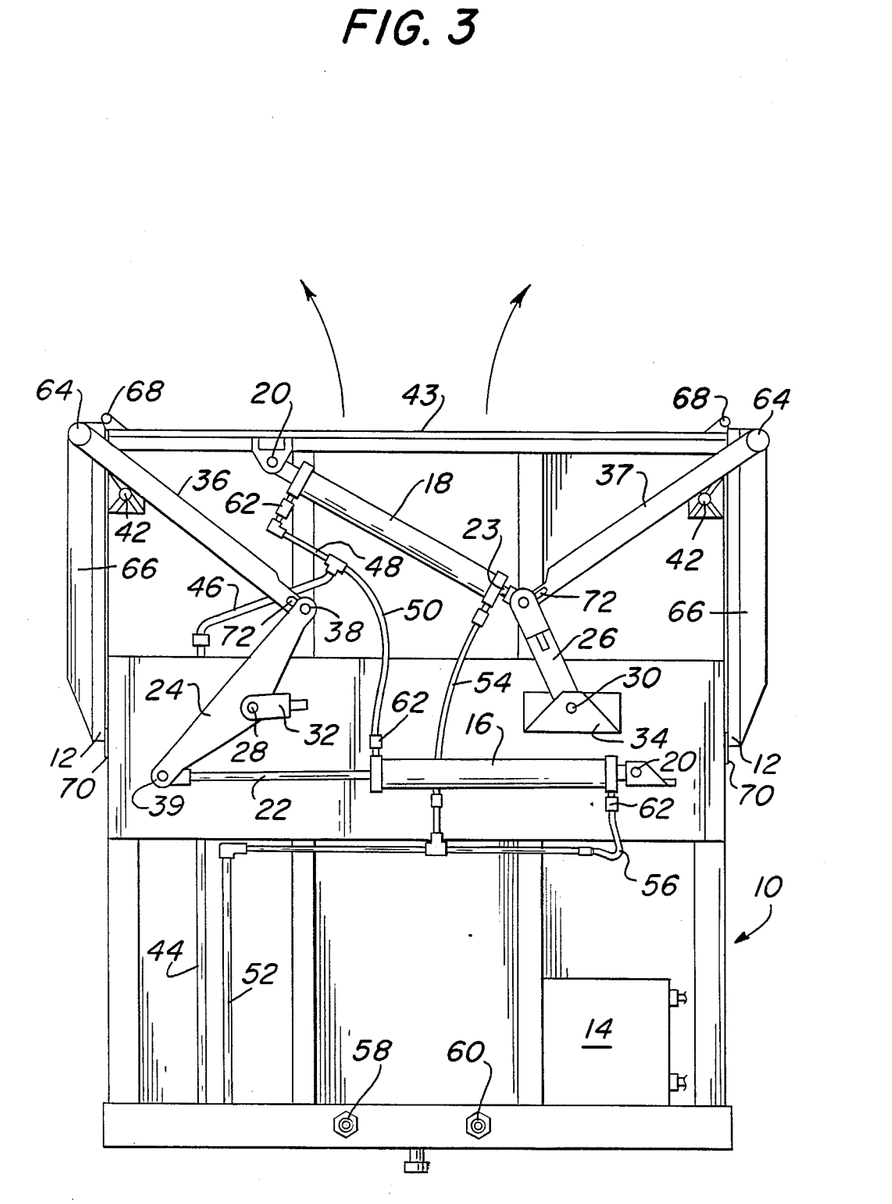
FIG. 3 is another front view of the invention shown in FIG. 2, with the truck doors shown in a fully opened position.

FIGS. 2 and 3 show the opening/closing mechanism in more detail. The mechanism includes electronic control mechanism 14 and fluid actuated cylinders 16 and 18 which are mounted in opposing fashion so that one cylinder is fully retracted when the other is fully extended. Cylinders 16 and 17 can be either hydraulic or pneumatic cylinders. However, in the preferred embodiment hydraulic cylinder Model No. PMC-9330 manufactured by Prince Manufacturing Corp., 4600 Smith Lewis Boulevard, Box 537, Sioux City, Iowa 51102 is employed. As will be recognized by those skilled in the art such a cylinder has a 30 inch stroke, however, in the preferred embodiment the cylinder is fitted with a one-half inch mechanical stop inside the cylinder to limit the stroke to 29½ inches. This limit was added to prevent full extension of the cylinder rod and possible damage to the cylinder. Furthermore, the limited stroke prevents the lids from contacting the sides of the trailer body and acts as a positive stop for the doors as they complete their rotation.

Cylinders 16 and 18 are rotatably attached to trailer 10 at their base ends 20 so they are free to rotate about their point of attachment. Each of the cylinder piston rods 22 and 23, typically constructed of stainless steel to avoid problems associated with corrosion, are rotatably attached to a first pivot member 24 and to a second pivot member 26 respectively. First pivot member 24 is rotatably attached, at approximately its center, to pivot pin 28. Second pivot member 26 is rotatably attached to pivot pin 30. Pins 28 and 30 are rigidly affixed to trailer 10 and supported at their distal ends by flanges 32 and 34 respectively which are secured to the trailer body.

The end of first pivot member 24 furthest from cylinder 16 is rotatably attached to door control member 36 by a pivot pin 38. Thus, pin 38 connects member 24 and member 36 at a common point. Rod 22 of cylinder 16 is connected to member 24 by pin 39. The end of second pivot member 26 that is attached to rod 23 of cylinder 18 is attached to door control member 37 by a pivot pin 40. Thus, pin 40 connects rod 22 of cylinder 18, member 26 and member 37 at a common point. The distances between pin 28 and pin 38 and the distance between pin 30 and pin 40, designated "a" on FIG. 2, are substantially equal. As noted previously pins 28, 38, 30 and 40 are on substantially a common center line when the mechanism is in the position depicted in FIG. 2. Door control members 36 and 37 are identical with each member having a slot 72 at its bottom end which receives pins 38 and 40 respectively. Typically, these slots 72 are oval shaped and approximately 1⅜ inches long and 1 1/64 inches wide.

The door opening/closing mechanism also includes stops 42. These stops are rigid pins with a cover roller or sleeve to contact members 36 and 37 and are attached to and extend from the end of trailer 10, their function will be described in more detail hereinafter.

In the preferred embodiment, cylinders 16 and 18 are hydraulic cylinders connected to fluid supply pipe 44 via hoses 46, 48 and 50, and to fluid supply pipe 52 via hoses 54 and 56. Pipes 44 and 52 terminate at connections 58 and 60. Flow control valves 62 are dispersed among the various hoses connected to cylinders 16 and 18. In the preferred embodiment, the flow control valves are a Colorflow ® valve Model No. F-800, available from Parker Fluidpower, Hydraulic Valve-Division, 520 Ternes Avenue, Elyria, Ohio, 44035. It will be understood by thoses skilled in the art that the use of pneumatic cylinders will generally require the use of heavier cylinders or lighter doors, since pneumatic and hydraulic cylinder of equal size generally do not generate the same pressures. Since size is a consideration, hydraulic cylinders are preferred.

Figure 4:
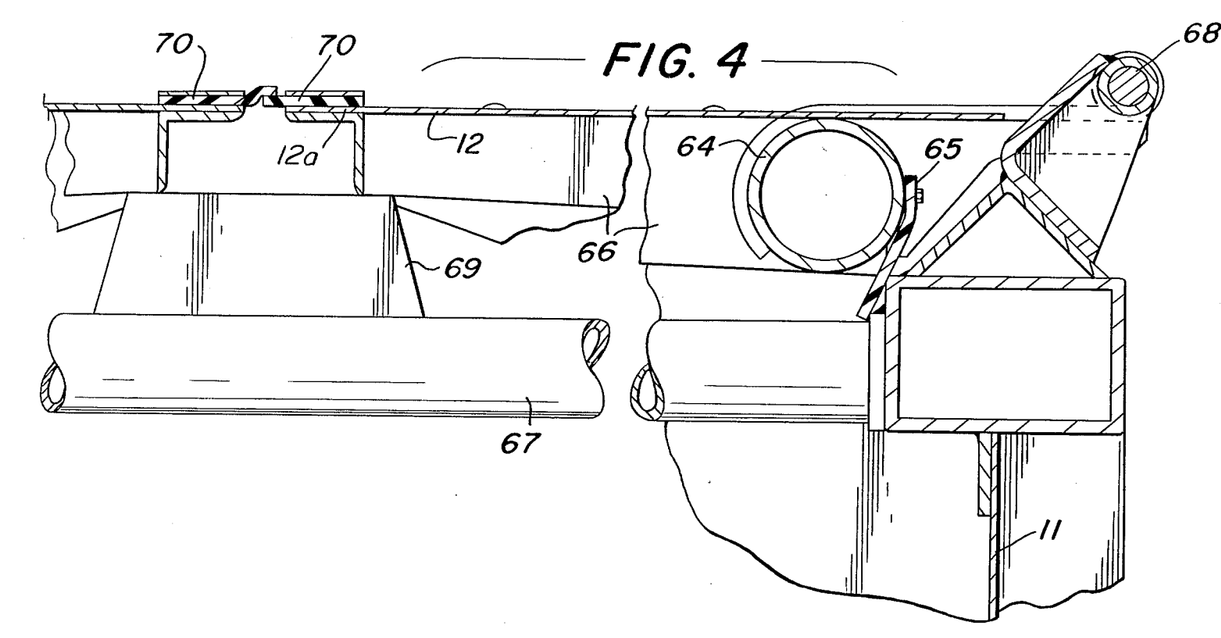
FIG. 4 is a partially cutaway sectional view taken along line 4—4 of FIG. 1, which shows a portion of the truck doors in more detail.

Referring to FIGS. 1–4, the doors 12 will now be described in more detail. Each door includes a torque tube 64 which extends the length of door 12 and is rigidly affixed to door 12. Each torque tube 64 is rigidly attached to a plurality of ribs 66 (shown in FIG. 4)

which extend in parallel fashion from tube 64 to the distal ends of doors 12. Additionally, each end of torque tube 64 extends slightly beyond the end of each door 12 so that the top ends of door control members 36 and 37 can be rotatably attached to torque tubes 64. For added rigidity the torque tubes 64 may include a solid insert, not shown, extending from the attachment of control members 36 and 37 rearwardly for approximately nine feet.

Doors 12 are each attached to trailer 10 by a plurality of hinges 68 shown generally in FIG. 1. Each hinge 68 is an offset hinge that is shown in more detail in FIG. 4. To avoid hinge deformation during opening and closing of doors 12, the hinges adjacent the door control members 36 and 37 may be strengthened by providing a double wide hinge, not shown.

Referring to FIGS. 1 and 3, rubber door lips 70 are shown located at the distal ends of each door. These lips are constructed to overlap each other as shown in FIG. 4, or to tightly meet one another so doors 12 are tightly sealed along their distal edges when closed.

In the preferred embodiment, door control members 36 and 37, first pivot member 24, and second pivot member 26 are constructed of machined steel. Conventional grease fittings (not shown) are employed at the various rotational interconnections of these members.

Figure 5:
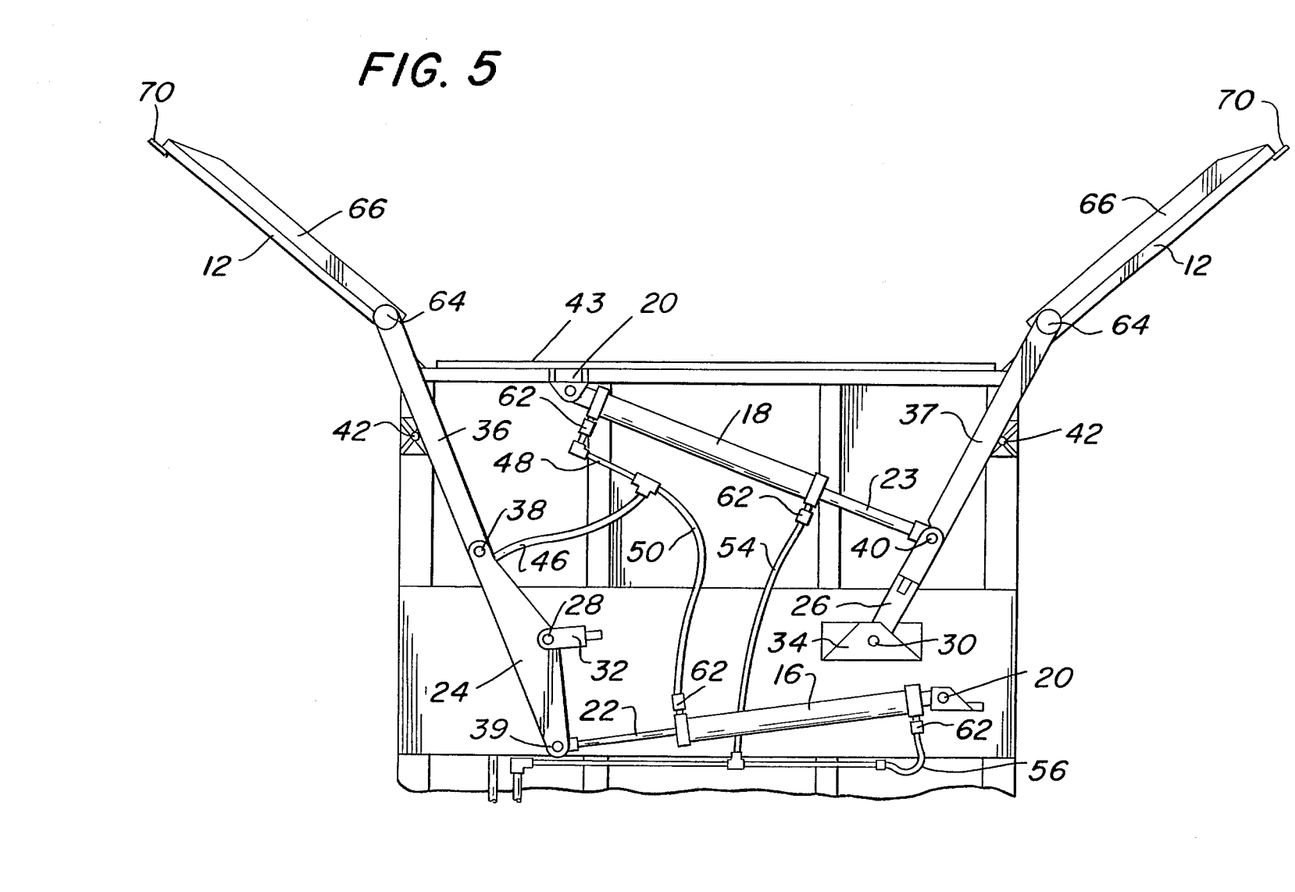
FIG. 5 is a front view of the invention shown in FIG. 2, with the doors shown partially open.

The operation of the invention will now be described with reference to the Figures. In FIGS. 1 and 2, doors 12 are shown in their closed position covering the top of trailer 10. In FIG. 5, the doors 12 are shown partially opened and in FIG. 3 the doors 12 are shown fully opened.

When the doors 12 are in their closed position, cylinder 16 is fully retracted and cylinder 18 is fully extended. However, when the doors 12 are fully open (FIG. 3) cylinder 16 is now fully extended and cylinder 18 is now fully retracted.

In the preferred embodiment, cylinders 16 and 18 are hydraulic cylinders with actuating pressure being provided by hydraulic fluid provided via connections 58 and 60 to pipes 44 and 52. Existing hydraulic systems (not shown), typically employed in trailers for operating a walking floor for removal of a load from the trailer, can be the source of the hydraulic fluid provided to connections 58 and 60. Typically, such systems provide hydraulic fluid at the minimum rate of 30 gallons per minute. However, the door opening/closing mechanism only requires a small portion of this hydraulic fluid. Therefore, through the use of flow control valves 62, the fluid pressure can be reduced so that a fluid flow of only about 4 gallons per minutes reaches cylinders 16 and 18, since this is all they require to operate.

To activate the door opening/closing mechanism so that doors 12 are moved from their closed position to an opened position, the operator actuates a control mechanism such as control 14. Control mechanism 14 is a conventional control system that activates and regulates the flow of hydraulic fluid provided to pipes 44 and 52. Typically, the operator will manually select the desired operation by pressing switches or similar devices on the control mechanism 14. In preferred embodiments, the operator can select any one of three functions. The doors can be opened and closed substantially simultaneously. If the flow control valves have been preset to do so, the left door can be opened and closed alone, or the right door can be opened and closed alone.

Referring to FIG. 2, if the operator selects simultaneous opening of the doors, cylinder 16 will be supplied hydraulic fluid via hose 56 and cylinder 18 will be supplied hydraulic fluid via hose 54. This will cause rod 22 of cylinder 16 to extend, causing first pivot member 24 to rotate about pin 28, thereby moving corresponding door control member 36. At the same time rod 23 extends from cylinder 16, rod 22 of cylinder 18 is retracted into cylinder 18. This causes second pivot member 26 to rotate about pin 30, thereby moving corresponding door control member 37.

Initially the pins 38 and 40 connecting the first and second pivot members to respective control members 36 and 37 translate substantially longitudinally in slots 72 provided in control members 36 and 37. The relief motion provided by slot 72 prevents "locking-up" of the door opening/closing mechanism during operation.

Once the pins 38 and 40 have traversed slot 72, door control members 36 and 37 initially move upward and then they rotate. The upper ends of door control members 36 and 37, which rotate freely about the ends of torque tubes 64, push against the torque tubes and cause doors 12 to rotate about hinges 68 to their open positions as shown in FIG. 3.

Referring to FIG. 4, the relationship between door 12, torque tube 64, and hinges 68 is shown in more detail. Hinges 68 are offset to accommodate the initial upward translation of door 12 and to allow the door to rotate up to 274° to a position approximately parallel to the trailer body, FIG. 3, without becoming hinge bound. Additionally, ribs 66 are shown rigidly attached to torque tubes 64 and doors 12. These ribs, which extend in parallel fashion from the torque tube to the distal end 12a of door 12, resist the large torsional forces exerted on the doors during opening. These forces can be especially large in view of the length of the doors 12 and the fact that the opening/closing mechanism is located at one end of the trailer. A rubber seal 65 in the shape of a flap is attached to torque tube 64 extending into the trailer 10. Seal 65 extends the length of torque tube 64 to cover hinges 68 when the doors 12 are in the open position. A cross brace 67 is provided which extends between the side walls 11 of trailer 10 at approximately the center of trailer 10. The cross brace 67 includes a stop 69 (FIG. 4) upon which doors 12 rest in the closed position. Stop 69 is of such a height as to allow doors 12 to come to rest slightly below the horizontal position. In the preferred embodiment the doors rest approximately four (4) degrees below the horizontal plane defined by the hinge.

Once the doors 12 are in their fully opened position (shown in FIG. 3), door control members 36 and 37 may rest against rigid bumpers 42. Upon actuation of the mechanism for closing of doors 12, cylinder 16 will be supplied hydraulic fluid via hose 50 and cylinder 18 will be supplied hydraulic fluid via hose 48. This will cause rod 22 of cylinder 16 to retract and rod 22 of cylinder 18 to extend. First pivot member 24 and second pivot member 26 will then rotate about pivots 28 and 30 respectively, causing corresponding motion of door control members 36 and 37. Again, slots 72 in door control members 36 and 37 prevent "locking-up" of the mechanism when the closing motion is initiated. Each door control member 36 and 37, which is limited in its outward travel in part by rigid bumpers 42, see FIG. 5, will ultimately rotate to its closed position once the doors 12 are fully closed (shown in FIG. 2).

The bumpers 42 are also contacted momentarily by door control members 36 and 37 during the opening and closing cycle. This momentary contact provides a fulcrum for door control members 36 and 37 as they move from the door closed positions shown in FIG. 2 through the partially opened positions shown in FIG. 5. In the fully opened positions as shown in FIG. 3 there remains a gap of from approximately ½ inch to 1 inch between the doors 12 and the sides of the trailer 10. In this fully opened position, door control members 36 and 37 rest on bumpers 42 which work in combination with the mechanical stops inside cylinders 16 and 18 to control the fully opened position of the doors.

An important feature of the invention is that the doors 12 are controlled at all times during opening/closing through their entire range of travel. This prevents damage from the doors 12 banging against the trailer and allows the doors to be opened to any desired point between the fully open and fully closed positions.

If the operator selects independent opening of either door 12 and adjusts the flow valves 62 accordingly, operation is the same as already described for simultaneous operation of the doors except that only the hydraulic cylinder corresponding to the chosen door will be activated. Additionally, in the preferred embodiment, flexible lips 70 are identical and designed to overlap one another so a tight seal will be developed when the doors 12 are both closed regardless of which door is opened and closed.

In alternate embodiments of the invention, the door opening/closing mechanism can be controlled from the truck cab in lieu of or in addition to being controllable from control mechanism 14 located on trailer 10. Appropriate cylinders 16 and 18 can also be used so the door opening/closing mechanism can be operated with pneumatic pressure instead of hydraulic pressure. Also, the door opening/closing mechanism can use a separate dedicated hydraulic or pneumatic pressure source in lieu of utilizing an existing source used by a truck for other purposes. In this latter embodiment, the flow valves 62 may be reduced in number or eliminated if suitable control of the fluid pressure can be achieved from the fluid source. Finally, the invention is obviously adaptable to containers such as dump trailer and roll-off containers, in addition to truck trailers in general.

There has thus been shown and described a novel trailer door actuating mechanism which fulfills all the objects and advantages sought. Any changes, modifications, variations, and other uses and applications of the subject invention, will become apparent to those skilled in the art upon considering the specification and the accompanying drawings which disclose the preferred embodiments. All such changes, modifications, variations, and other uses and applications within the spirit and scope of the invention are deemed to be covered by the invention which is limited only by the claims which follow.

I claim:

1. Apparatus for actuating a trailer cover through an arc of approximately 270°, comprising:
   (a) a trailer;
   (b) a pair of doors, each of which is rotatably connected to a tap of said trailer along a respective longitudinal edge of said trailer;
   (c) means for opening/closing said doors by rotating said doors through said arc, said means further including:
      (i) a pair of opposed fluid actuated cylinders located at one end of said trailer, each cylinder having a free end and a fixed end, said fixed ends being rotatably connected to said trailer,
      (ii) a first member and a second pivot member each rotatably attached to a respective one of said cylinder free ends, and each being further separately rotatably connected along a substantially common horizontal centerline through respective pivot means affixed to said trailer,
      (iii) a pair of substantaily identical door control members, each of said control members attached to one of said doors at said control member top end, and each of said control member bottom ends attached to one of said first pivot member and second pivot member, whereby distances between each of said control member bottom ends and a respective one of said pivot means are substantially equal; and
   (d) a control mechanism for selectively operating said doors between opened and closed positions.

2. The apparatus of claim 1, wherein each of said doors further comprises a torque tube affixed to said door, and extending the length of said door adjacent the longitudinal edge of said door that is affixed to said trailer, said torque tube being rotatably connected to one of said door control members.

3. The apparatus of claim 2, wherein each of said doors further comprises a plurality of support ribs affixed to said door and to said torque tube for resisting torsional distortion of said door.

4. The apparatus of claim 2, wherein said torque tube is hollow along at least a portion of its length.

5. The apparatus of claim 1, wherein each of said doors is rotatably connected to said trailer top along a longitudinal edge of said trailer by a plurality of hinges, each hinge being offset from the point where said door edge and said longitudinal edge of said trailer coincide.

6. The apparatus of claim 1, wherein each of said pair of opposed fluid actuated cylinders is an hydraulic cylinder.

7. The apparatus of claim 1, wherein each of said pair of opposed fluid actuated cylinders is a pneumatic cylinder.

8. The apparatus of claim 1, wherein each of said door control members further comprises a slot at said bottom end, and a pin, capable of translational motion in said slot, for connecting said door control members with said respective first and second pivot members.

9. The apparatus of claim 1, further comprising a pair of bumper means, each of said bumper means attached to said trailer at a position below and parallel to a respective longitudinal edge whereby said bumper means abuts against a respective door control member when the door is moved between the opened and closed positions.

10. The apparatus of claim 1, wherein said means for opening/closing said doors further comprises a plurality of flow control valves for regulating the fluid flow provided to each of said fluid actuated cylinders.

11. The apparatus of claim 1, further comprising a pair of stops, each of said stops attached to said trailer at a position below and parallel to a respective longitudinal edge.

12. The combination of a refuse container, cover and actuating mechanism for rotating the cover through an arc of at least 270°, said combination comprising:
   (a) an opened top refuse container having two end walls, two longitudinal side walls and a bottom;
   (b) a cover which is further comprised of:

(i) a pair of doors, each of which is hinged to said container along a top longitudinal edge of a respective side wall;

(ii) a torque tube extending the length of each door and rigidly attached thereto adjacent the hinged longitudinal edge and a plurality of support ribs affixed to said torque tubes; and (c) an actuating means which is further comprised of:

(i) a pair of opposed hydraulic actuated cylinders, each cylinder having a free end and a fixed end, said fixed end being rotatably connected to said container;

(ii) a first pivot member and a second pivot member each rotatably attached to a respective one of said cylinder free ends and each being separately rotatably connected on a substantially common horizontal centerline through respective pivot means to an end wall of said container, (iii) a pair of substantially identical door control members, each of said control members attached to a respective door at said control member top end, and each of said control member bottom ends having a slot which receives a pin connecting said bottom end of said control member to a respective pivot member, whereby distances between each of said control member bottom ends and a respective one of said pivot means are substantially equal;

(d) a pair of bumper means, each of said bumper means attached to said container end wall adjacent a top corner thereof; and (e) a control mechanism for selectively actuating said doors.

13. An apparatus for actuating through an arc of at least 270° top opening container doors which are rotatably connected to a top of said container along respective opposed edges thereof, said apparatus comprising:

(a) actuating means for opening and closing said doors by controllably rotating said doors through said arc, said means further comprising:

(i) a pair of fluid actuated cylinders, each of said cylinders having a free end and a fixed end with said fixed end being rotatably connected to said container, (ii) first and second pivot members, each separately rotatably connected to said container on a substantially common centerline, each respective pivot member rotatably attached to a respective cylinder free end, and (iii) a pair of substantially identical door control members, each of said door control members being a rigid member attached at its top end to a respective door and at its bottom end to a respective pivot member, whereby distances between each of said control member bottom ends and a respective one of said rotatable connections of said respective pivot members to said container are substantially equal; and (d) means for selectively energizing said actuating means to open/close said doors through the movement of said control members.

14. The apparatus of claim 13, wherein said apparatus further comprises a torque tube affixed to each of said doors and extending the length of said doors adjacent the longitudinal edge that is affixed to said container, said torque tube being rotatably connected to a respective door control member.

15. The apparatus of claim 14 wherein each of said torque tubes further comprises a plurality of support ribs affixed thereto.

16. The apparatus of claim 14, wherein said torque tube is hollow along at least a portion of its length.

17. The apparatus of claim 13, wherein each of said pair of opposed fluid actuated cylinders is an hydraulic cylinder.

18. The apparatus of claim 13, wherein each of said pair of opposed fluid actuated cylinders is a pneumatic cylinder.

19. The apparatus of claim 13, wherein each of said door control members further comprises a slot at said bottom end, and a pin, capable of translational motion in said slot, for connecting said door control members with said respective first and second pivot members.

* * * * *

UNITED STATES PATENT AND TRADEMARK OFFICE
CERTIFICATE OF CORRECTION

PATENT NO. : 4,767,152

DATED : August 30, 1988

INVENTOR(S) : Eugene F. Stluka et al

It is certified that error appears in the above-identified patent and that said Letters Patent is hereby corrected as shown below:

Column 2, line 13, before the word "trailer" delete the word "a".

Column 4, line 24, the word "furthest" should read --farthest--.

Column 4, line 31, the numeral "22" should read --23--.

Column 4, line 58, the word "thoses" should read --those--.

Column 7, line 60, the word "tap" should read --top--.

Column 8, line 1, before the word "first" insert the word --pivot--.

Column 8, line 7, the word "substantailly" should read --substantially--.

Signed and Sealed this

Twenty-fourth Day of January, 1989

Attest:

DONALD J. QUIGG

Attesting Officer      Commissioner of Patents and Trademarks